April 21, 1931.  C. S. BRAGG ET AL  1,801,410
BRAKE MECHANISM FOR AUTOMOTIVE VEHICLES
Filed Dec. 12, 1927
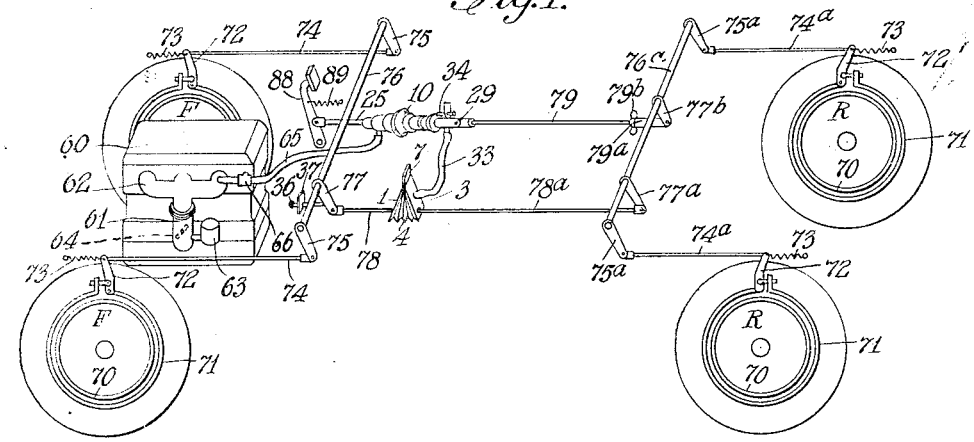
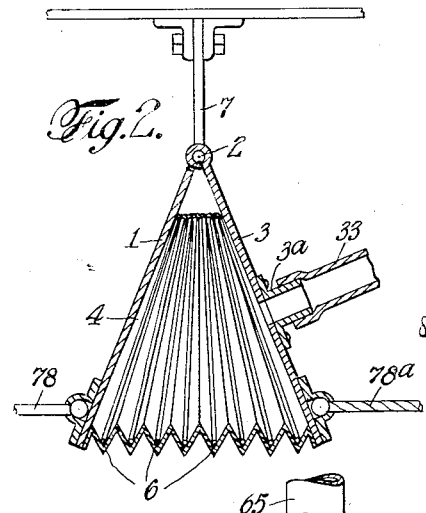
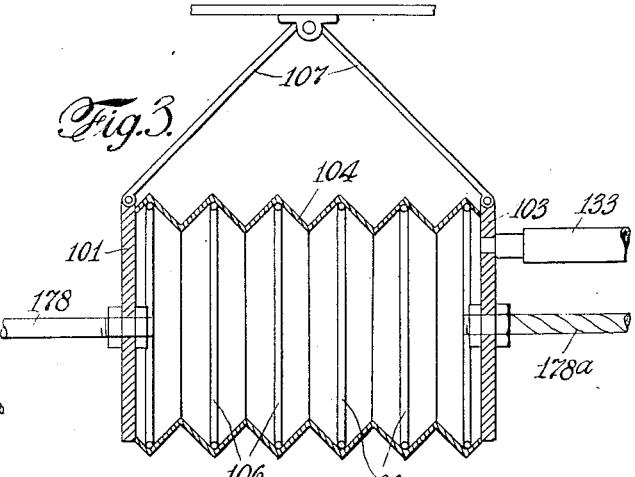
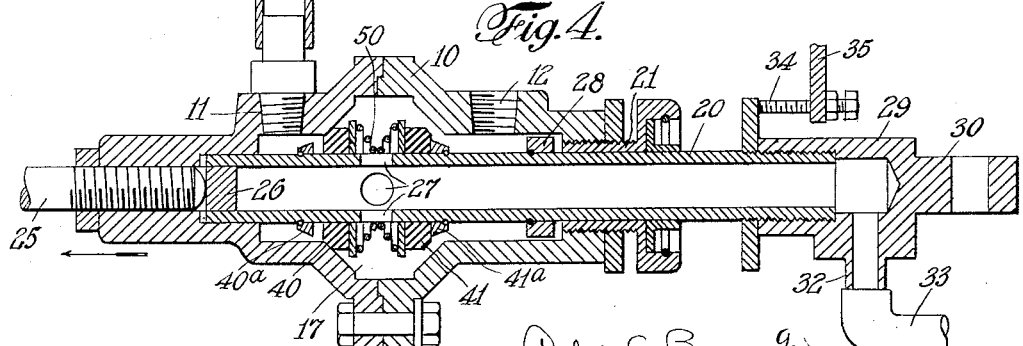

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed December 12, 1927. Serial No. 239,443.

Our invention consists in the novel features hereinafter described, reference being had to the accompanying drawing which shows two embodiments of our invention selected by us for purposes of illustration, and the said invention is fully disclosed in the following description and claims.

The object of our invention is to provide a brake system for a plurality of wheels of an automotive vehicle including the steering wheels and non-steering or traction wheels, all of which are simultaneously applied by a power actuator operated preferably by a substantially constant maximum differential of fluid pressures, and comprising two parts both movable with respect to the vehicle toward and from each other and connected by a collapsible enclosing member of the bellows or accordion type, each of said movable parts being connected with brake mechanisms for one pair of wheels only, said connections applying the power of the actuator to the brake mechanisms of both pairs of wheels at predetermined leverages, which will enable the maximum power of the actuator to be applied without locking the steering wheels upon the average dry pavement or roadway, and without locking the rear or driving wheels upon the average dry pavement or roadway, even when the vehicle is lightly loaded, means being provided whereby the physical force of the operator may be added to the brake mechanisms for the rear or driving wheels only to supplement the action of the power actuator in stopping the vehicle when heavily loaded, or in making emergency stops, and to apply the brakes for the rear or driving wheels in case of failure of power, the brake mechanisms for the front or steering wheels being applied only by means of the power actuator and to the predetermined extent provided by the connections therefrom.

In the operation of a brake system embodying our invention, the average stop of the vehicle is effected by the power actuator alone without the possibility of locking either the steering wheels or the driving wheels on the average pavement when dry, and a larger proportion of the braking action may, therefore, be effected by the brake mechanisms for the steering wheels than would otherwise be possible, and the physical force of the operator will be applied only for emergency stops or in case of excessive loads, and in such cases will be applied only to the brake mechanisms for the rear or driving wheels, which especially in the case of trucks or buses carry the greater part of the load of the vehicle and its contents, and therefore more power is required to apply the rear wheel brake mechanisms effectively when the vehicle is heavily laden than when it is light. In the operation of a brake system embodying our invention, the vehicle may be stopped more quickly and with less danger of locking the wheels and consequent skidding even on wet pavements, and longer wear of the brakes and tires will necessarily result.

We also prefer to construct the actuator cylinder so that the movements of the movable parts connected with the brake mechanisms toward each other to produce a power stroke for the application of the brakes will be sufficient to compensate for normal wear of the braking surfaces without permitting said movable parts to reach their limits of movement, and as the power actuator will automatically distribute its power to the brake mechanisms for both pairs of wheels uniformly at all times according to the predetermined leverages in its connections therewith, without regard to the wear of the braking surfaces, the brake mechanisms may be used for very long periods without adjustment. We prefer to provide an adjusting device in the connections between the operator operated part and the brake mechanisms for the non-steering wheels so that the operator operated part, as for example the foot lever, may be prevented from reaching its limit of movement before the brake mechanisms connected therewith are fully applied, this being the only adjusting means which it may be necessary to operate, so that the brake system may be operated for long periods without any adjustment at all until the brake linings are worn out, and if any adjustment is required it may be accomplished by a single adjustment in the connections between the foot lever and the rear wheel brake mechanisms.

Referring to the accompanying drawings,

Fig. 1 is a diagrammatic view representing an installation of brake mechanism in an automotive vehicle embodying our invention.

Fig. 2 is an enlarged detail sectional view of the power actuator illustrated in Fig. 1.

Fig. 3 is a similar view illustrating a modification.

Fig. 4 is an enlarged sectional view of one form of valve mechanism which may be employed for controlling the actuator.

Referring to Figs. 1, 2 and 4, 60 represents an internal combustion engine for propelling the vehicle indicated diagrammatically in Fig. 1, the engine having the usual suction passage comprising a vertical portion, 61, and intake manifold, 62, for supplying the charges to the cylinder of the engine from the carburetor, 63, under the control of the usual throttle valve, 64, interposed between the carburetor and the cylinders of the engine. The front or steering wheel brake mechanisms are indicated at F, F, and the rear or driven wheel brake mechanisms at R, R. The brake mechanisms may be of any desired type, but are shown for convenience in this instance as comprising each a brake drum, 70, brake band, 71, brake operating lever, 72, with the usual retracting spring, 73. The levers, 72, of the front wheel brake mechanism are connected by links, 74, with arms, 75, on a rock shaft, 76, secured to the chassis of the vehicle and provided with an actuating arm, 77. The levers, 72, of the rear wheel brake mechanisms are connected by links, 74ª, 74ª, with arms, 75ª, 75ª, with a rock shaft, 76ª, provided with actuating arms, 77ª and 77ᵇ.

The power actuator shown in these figures is of the bellows type and comprises two members, 1 and 3, both movable with respect to the chassis, and being hinged or pivotally connected with each other, as indicated at 2, in any desired manner, said members being movable toward and from each other and being connected by a collapsible bellows, indicated at 4, so as to form an air-tight chamber between said movable members, capable of being varied as to its capacity by the movements of said members, 1 and 3, toward and from each other. The bellows member may be provided with suitable means, as stiffening wires or frames, indicated at 6, to prevent the distortion of the bellows member by the differential or fluid pressures on its walls. The actuator is preferably pivotally supported adjacent to the pivotal connection between the members, 1 and 3, from the chassis, a bracket or hanger, 7, for this purpose being indicated in Fig. 2, the construction being such that the members, 1 and 3 are movable pivotally with respect to each other and with respect to the bracket or hanger and supporting the bellows member. One of the movable members of the actuator, as the member, 1, is connected adjacent to its outer end by link, 78, with the arm, 77, on the rock shaft, 76, connected with the front or steering wheel brake mechanisms, and the other member of the actuator, as the member, 3, is connected by a link, 78ª, which is preferably in the form of a flexible cable, with the arms, 77ª, on the rock shaft, 76ª, for the rear or traction wheel brake mechanisms.

The exterior surfaces of the actuator members, 1 and 3, being exposed at all times to atmospheric pressure, it is obvious that by withdrawing air from the chamber within the actuator, the members, 1 and 3, will be caused to move toward each other, thereby applying both sets of brake mechanisms connected therewith and acting as an equalizing device to distribute the power of the actuator uniformly at all times between the front or steering wheel brake mechanisms and the rear or traction wheel brake mechanisms, in accordance with the predetermined leverages provided in the connection between the actuators and said brake mechanisms, and the leverages at which the power of the actuator is applied to both sets of brake mechanisms is such that the front or steering wheel brake mechanisms and preferably the brake mechanisms for the rear or traction wheels also, will not lock the wheels of the vehicle to which they are applied on an ordinary dry pavement or roadway. It is obvious that the particular leverages at which the power is applied to the several brake mechanisms may be predetermined, so as to secure the desired results with the particular type of brake mechanisms and connections employed.

We prefer to utilize the suction existing in the suction passage of the engine between the throttle valve and the engine cylinders when the engine is running and the throttle valve is closed or partly closed, as the source of suction or lower fluid pressure for the operation of the actuator, and to connect the actuator with the suction passage and with the atmosphere under the control of valve mechanism, which is preferably located in linkage between the operator operated part for the valve mechanism and the brake mechanisms for the nonsteering wheels only. The particular construction of the valve mechanism forms no part of our present invention and may be of any desired type. For purposes of illustration, we have shown in Figs. 1 and 4 a type of valve mechanism which forms the subject matter of our former application for Letters Patent of the United States, filed March 13, 1923, and given Serial No. 94,412, which will therefore be described only sufficiently to enable the operation of the power actuator to be understood. The valve mechanism comprises a valve casing, 10, provided with a central valve chamber, 17, having oppositely disposed valve seats and oppositely disposed valves, 40 and 41, controlling the communication respectively between said chamber and apertures, 11 and 12, provided in the casing on opposite sides of the valve chamber. The valves, 40 and 41, are preferably formed of molded rubber, cork, or other suitable material, and are provided with central apertures having a sealing engagement with a hollow valve actuating sleeve, 20, which is provided with collars, 40ª and 41ª, on opposite sides of the said pair of valves, and said valves are yieldingly pressed toward their seats by a spring, or springs, indicated at 50, the said collars being so arranged that a longitudinal movement of the valve actuating sleeve in either direction will effect the opening of one valve after permitting the other to be closed by the spring, and to permit both valves to be seated simultaneously. Means are also provided for limiting the relative movement between the valve actuating sleeve and the valve casing to provide a limited amount of lost motion. In this instance a collar, 28, on the valve sleeve engaging an adjustable sleeve, 21, in the end of the valve casing limits the movement of the sleeve, 20, in one direction, its movement in the opposite direction being limited by the engagement of a plug, 26, which closes the inner end of the valve actuating sleeve with the threaded end of a link rod, 25, which connects the valve casing with an operator operated part, as the foot lever, 88, provided with the usual retracting spring, 89, the valve actuating sleeve, 20, being provided with apertures, 27, communcating with the valve chamber, 17, and the outer end of said sleeve is provided with a fitting, 29, having a nipple, 32, communicating with the interior of the sleeve, and an ear or lug, 30, which is connected by a link rod, 79, with the arm, 77ᵇ, on the rock shaft, 76ª, for operating the rear wheel brake mechanisms through the intervention of an adjusting device, indicated at 79ª, which may be a turnbuckle or equivalent threaded adjusting means, preferably provided with a wing nut, 79ᵇ, for varying the effective length of the rod, 79. In this instance the aperture, 11, in the valve casing is shown connected by a flexible pipe, 65, with the suction passage of the engine between the throttle valve and the cylinders thereof. The aperture, 12, of the valve casing is open to the atmosphere, and the nipple, 32, on the valve actuating sleeve is connected by a flexible pipe, 33, with a nipple, 3ª, on the member, 3, of the power actuator for connecting said pipe with the interior of the actuator, an adjustable stop, 34, supported from a bracket, 35, secured to the chassis is preferably provided for limiting the rearward movement of the valve actuating sleeve, 20, and the connected brake mechanisms when the valve mechanism is in the released or off position. The collars, 40ª and 41ª, are so spaced on the valve actuating sleeve that both valves may be seated at the same time, and one valve will open after the other is closed when the valve actuating sleeve is moved in either direction, and the stops provided for the valve mechanism are so adjusted that in the released position of the valve mechanism and brake mechanism illustrated in Figs. 1 and 4, the retracting means for the operator operated part will hold the valve casing in such position with respect to the sleeve, 20, that the suction valve, 40, will be normally maintained in closed position, while the inlet valve, 41, will be maintained in open position, thereby placing the interior of the actuator in communcation with the atmosphere, and equalizing pressures on the inner and outer faces of the members, 1 and 3.

Assuming that the engine is running and the throttle valve is closed or partly closed, a state of rarefaction is maintained in the suction passage of the engine and in the suction pipe, 65, which is preferably provided with a check valve, 66, opening in a direction toward the suction passage, to prevent variations in the degree of rarefaction in the suction passage from being transmitted to the suction pipe and to the power actuator when connected therewith. To effect an application of the brake mechanisms by power, the operator will depress the foot lever, 88, thereby moving the valve casing forward in the direction of the arrow in Fig. 4, permitting the air inlet valve, 41, to seat and cut off communication between the atmosphere and the interior of the actuator, and thereby opening the suction valve, 40, to place the interior of the actuator in communication with the suction pipe, 65. The air within the actuator will be withdrawn into the suction passage of the engine, and the differential of fluid pressures on the opposite faces of the members, 1 and 3, of the actuator will cause them to move toward each other, thereby applying simultaneously the brake mechanisms for the steering wheels and the non-steering wheels and distributing the power of the actuator to said brake mechanisms uniformly at all times in accordance with the predetermined leverages provided in the design of said brake mechanisms and connections, regardless of the differences in the wear of the braking surfaces respectively of said brake mechanisms, the actuator operating as an equalizing means to effect this result. As long as the operator continues to depress the foot pedal, the valve mechanism will move forward with the member, 3, of the actuator, to which they are operatively connected through the crossshaft, 76ª, and the connections previously described, and when the forward movement of the foot lever ceases, the continued movement of the actuator will move the valve actuating sleeve forward with respect to the valve casing sufficiently to close the suction valve, 40, without opening the inlet valve, 41, thus holding the brakes as applied. The operator will release the pressure on the foot pedal or remove his foot therefrom, and permit the retracting spring, 89, to move the valve casing, 10, rearwardly with respect to the valve actuating sleeve sufficiently to effect the closing of the suction valve and the opening of the air inlet valve, permitting atmospheric air to enter through the aperture, 12, in the valve casing and pass into the actuator, and as the pressure within the actuator again builds up to atmospheric pressure, the members, 1 and 3, of the actuator will move away from each other, releasing the brake mechanisms for both the steering wheels and non-steering wheels, the foot lever and the valve mechanism returning with the brake mechanisms for the non-steering wheels to the released position indicated in Figs. 1 and 4, in which said parts will be arrested by the stop, 34. We also prefer to provide an adjustable stop for limiting the extent to which the members, 1 and 3, of the actuator may separate thus relieving the bellows members from strain, and this may be conveniently effected by providing an adjustable stop, 36, on a bracket, 37, secured to the chassis for engaging the arm, 77, on the rock shaft, 76, as indicating in Fig. 1, or this result may be secured in other ways.

When the brakes have been fully applied by the actuator as previously described, the operator may add his physical strength to the brake mechanisms for the non-steering wheels only, if he so desires, by further depressing the foot lever so as to take up the lost motion between the valve casing and the valve actuating sleeve, and bringing the collar, 28, into engagement with the sleeve, 21, and this is frequently desirable for compensating for additional loading of the vehicle or in making emergency stops, and will be accomplished without in any way increasing the braking force applied to the front wheels. It will also be obvious that the operator by taking up this lost motion may apply the rear wheel brake mechanisms by physical force alone in case of failure of power, in which case the first part of the movement would shift the valve mechanism into position to vent the actuator, which would be necessary if the link, 78ª, were an unyielding connection. Where the link, 78ª, is a flexible cable, as indicated in Fig. 1, or is otherwise constructed so as to provide lost motion between it and the arm, 77ª, the operator may apply the rear or non-steering wheel brakes by physical force alone in case of failure of power without moving the actuator at all, but in either case the physical force of the operator can only be applied to the brake mechanisms for the rear or non-steering wheels.

In Fig. 3, we have shown a slightly modified form of power actuator which may be employed in carrying our invention into effect, and which is of what may be termed the accordion type. In this instance the power actuator comprises the members, 101 and 103, movable with respect to the chassis and toward and from each other, said members being substantially parallel and connected by a bellows like collapsible member, 104, the angular folds of which are provided with reinforcing frames, 106, to support them when the air is exhausted from the interior of the actuator to a greater or less extent. The members, 101 and 103, are movably supported with respect to the chassis, in this instance by links, 107, which permit the movements of the actuator members, 101 and 103 which in turn support the collapsible or bellows member. The member, 101, is connected by a link, 178, with the brake mechanisms for the steering wheels, and the member, 103, is connected by a link, 178ª, preferably in the form of a flexible cable, with brake mechanisms for the non-steering wheels in the same manner as indicated in Fig. 1, and the actuator will be connected to the valve mechanism by a flexible pipe, 133, in the same manner as shown in that figure. The operation of the brake system is exactly the same as that hereinbefore described with reference to Figs. 1, 2 and 4.

In both embodiments of our invention only one adjustment, to wit, the adjusting device, 79ª, located in the connection between the valve mechanism and the brake mechanisms for the rear wheel brakes need be made to maintain the parts in operative condition and compensate for the normal wear of the brake linings for a long period and until the brake levers assume inefficient angles, or until it becomes necessary to reline the brakes. The distance which each of the movable actuator members, 1 and 3, or 101 and 103, may move toward each other without bringing them into contact, or in other words the strokes of the actuator members will be sufficiently great to compensate for the wear of both the front and rear wheel brakes for a long period and maintain the predetermined pressures upon each, when applied, and compensate for the unequal wear of the linings or braking surfaces of the front and rear wheel brakes. Should the rear wheel brakes wear sufficiently to cause the foot pedal to reach the limit of its forward movement, usually determined by the pedal striking the floor board, before the said brakes are fully applied, it is only necessary to take up or shorten the connection, 79, between the valve mechanism and the rear wheel brake mechanisms, which can be done very conveniently by rotating the wing nut, 79$^b$, of the adjusting device, 79$^a$, which in connection with the adjustable stop, 34, determines the release or off position of the rear wheel brakes. The released positions for the front wheel brakes may be altered when desired by means of the adjustable stop, 36, before described. It is obvious that if the throw of the foot pedal were sufficiently long or its leverage connection with the brakes such that the throw of the pedal is as effectively great as the combined movements of the parts, no adjustment would be necessary, but structurally, this is rarely found to be practical in automotive vehicles.

It will be noted that in the constructions hereinbefore described, as both of the power applying members of the actuator are movable under the differential of fluid pressures on their opposite faces we obtain twice the power which would be obtained from an actuator of the same size in which one of said parts is rigidly connected to the chassis of the vehicle. This permits of the use of a smaller actuator than would otherwise be necessary, and less air would have to be exhausted from the actuator and delivered to the suction passage of the engine in effecting an application of the brakes, and there is, therefore, less danger of interfering with the operation of the engine or stalling it by the air exhausted from the power actuator.

What we claim and desire to secure by Letters Patent is:—

1. In a brake system for automotive vehicles provided with an internal combustion engine having a throttle controlled suction passage, the combination with a pair of steering wheel brake mechanisms, and a pair of non-steering wheel brake mechanisms, of a power actuator comprising a pair of power applying members capable of movement with respect to the vehicle and each other, and a bellows member in sealing engagement with said members, connections from one of said members to the steering wheel brake mechanisms, connections from the other of said members to the non-steering wheel members, controlling valve mechanism, means for connecting the interior of said bellows member with said suction passage and with the atmosphere under the control of said valve mechanism, and a physically operable part, for operating said valve mechanism, operatively connected with the non-steering wheel brake mechanism.

2. In a brake system for automotive vehicles provided with an internal combustion engine having a throttle controlled suction passage, the combination with a pair of steering wheel brake mechanisms, and a pair of non-steering wheel brake mechanisms, of a power actuator comprising a pair of power applying members capable of movement with respect to the vehicle and each other, and a bellows member in sealing engagement with said members, connections from one of said members to the steering wheel brake mechanisms, connections from the other of said members to the non-steering wheel members, controlling valve mechanisms, means for connecting the interior of said bellows member with said suction passage and with the atmosphere under the control of said valve mechanism, and a physically operable part, said valve mechanism comprising relatively movable parts having a limited movement with respect to each other, connections from said physically operable part to one of said valve parts, and connections from the other of said valve parts to the non-steering wheel brake mechanisms.

3. In a brake system for automotive vehicles provided with an internal combustion engine having a throttle controlled suction passage, the combination with a pair of steering wheel brake mechanisms, and a pair of non-steering wheel brake mechanisms, of a power actuator comprising a pair of power applying members capable of movement with respect to the vehicle and each other, and a bellows member in sealing engagement with said members, connections from one of said members to the steering wheel brake mechanisms, connections from the other of said members to the non-steering wheel members, controlling valve mechanism, means for connecting the interior of said bellows member with said suction passage and with the atmosphere under the control of said valve mechanism, and a physically operable part for operating said valve mechanism, operatively connected with the non-steering wheel brake mechanism, and a single adjusting device in the connections between the physically operable part and the non-steering wheel brake mechanisms.

4. In a brake system for automotive vehicles provided with an internal combustion engine having a throttle controlled suction passage, the combination with a pair of steering wheel brake mechanisms, and a pair of non-steering wheel brake mechanisms, of a power actuator comprising a pair of power applying members capable of movement with respect to the vehicle and each other, and a bellows member in sealing engagement with said members, connections from one of said members to the steering wheel brake mechanisms, connections from the other of said members to the non-steering wheel members, controlling valve mechanism, means for connecting the interior of said bellows member with said suction passage and with the atmosphere under the control of said valve mechanism, and a physically operable part, said valve mechanism comprising relatively movable parts having a limited movement with respect to each other, connections from said physically operable part to one of said valve parts, and connections from the other of said valve parts to the non-steering wheel brake mechanisms, and a single adjusting device in the connections between the non-steering wheel brake mechanisms and the valve part connected therewith.

5. In a brake system for automotive vehicles provided with an internal combustion engine having a throttle controlled suction passage, the combination with a pair of steering wheel brake mechanisms, and a pair of non-steering wheel brake mechanisms, of a power actuator comprising a pair of power applying members capable of movement with respect to the vehicle and each other, and a bellows member in sealing engagement with said members, connections from one of said members to the steering wheel brake mechanisms, connections from the other of said members to the non-steering wheel members, controlling valve mechanism, means for connecting the interior of said bellows member with said suction passage and with the atmosphere under the control of said valve mechanism, and a physically operable part for operating said valve mechanism, operatively connected with the non-steering wheel brake mechanism, and stops for engaging parts of the said respective connections from the actuator to the brake mechanisms for the steering and non-steering wheels to limit the return movement of said connections to released position.

6. In a brake system for automotive vehicles provided with an internal combustion engine having a throttle controlled suction passage, the combination with a pair of steering wheel brake mechanisms, and a pair of non-steering wheel brake mechanisms, of a power actuator comprising a pair of power applying members capable of movement with respect to the vehicle and each other, and a bellows member in sealing engagement with said members, connections from one of said members to the steering wheel brake mechanisms, connections from the other of said members to the non-steering wheel members, controlling valve mechanism, means for connecting the interior of said bellows member with said suction passage and with the atmosphere under the control of said valve mechanism, and a physically operable part, said valve mechanism comprising relatively movable parts having a limited movement with respect to each other, connections from said physically operable part to one of said valve parts, and connections from the other of said valve parts to the non-steering wheel brake mechanisms, and a single adjusting device in the connections between the non-steering wheel brake mechanisms and the valve part connected therewith, and stops for engaging parts of the said respective connections from the actuator to the brake mechanisms for steering and non-steering wheels to limit the return movement of said connections to released position.

CALEB S. BRAGG.
VICTOR W. KLIESRATH.